United States Patent
Rakshit

(10) Patent No.: US 11,453,163 B2
(45) Date of Patent: Sep. 27, 2022

(54) ADDITIVE MANUFACTURING WITH MAGNETIC MANIPULATION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 16/551,959

(22) Filed: Aug. 27, 2019

(65) Prior Publication Data
US 2021/0060858 A1 Mar. 4, 2021

(51) Int. Cl.
| | | |
|---|---|---|
| B29C 64/194 | (2017.01) | |
| B33Y 10/00 | (2015.01) | |
| B33Y 30/00 | (2015.01) | |
| B33Y 50/00 | (2015.01) | |
| B33Y 70/00 | (2020.01) | |
| B33Y 80/00 | (2015.01) | |
| B29C 64/20 | (2017.01) | |
| B29C 64/386 | (2017.01) | |
| B29K 101/12 | (2006.01) | |
| B29K 505/00 | (2006.01) | |

(52) U.S. Cl.
CPC ............ *B29C 64/194* (2017.08); *B29C 64/20* (2017.08); *B29C 64/386* (2017.08); *B33Y 10/00* (2014.12); *B33Y 30/00* (2014.12); *B33Y 50/00* (2014.12); *B33Y 70/00* (2014.12); *B33Y 80/00* (2014.12); *B29K 2101/12* (2013.01); *B29K 2505/00* (2013.01); *B29K 2995/0008* (2013.01)

(58) Field of Classification Search
CPC .............................................. B29K 2995/0008
See application file for complete search history.

(56) References Cited

U.S. PATENT DOCUMENTS

| | | |
|---|---|---|
| 10,073,424 B2 | 9/2018 | Lin et al. |
| 10,331,110 B2 | 6/2019 | Lection et al. |
| 2016/0031156 A1* | 2/2016 | Harkness ............... B29C 64/10 |
| | | 264/405 |
| 2018/0194075 A1 | 7/2018 | Hardee et al. |
| 2019/0030803 A1 | 1/2019 | Nauka et al. |

OTHER PUBLICATIONS

Walter, K., "New 3D Printing Process Creates Magnets with No Rare Earth Waste, Greater Design Flexibility", R&D, May 14, 2018, 5 pages, <https://www.rdmag.com/article/2018/05/new-3d-printing-process-creates-magnets-no-rare-earth-waste-greater-design-flexibility>.
Alec, "Revolutionary 3D printed magnets by Polymagnet can change engineering as we know it", 3D printer and 3D printing news, Mar. 24, 2016, 14 pages, <https://www.3ders.org/articles/20160324-revolutionary-3d-printed-magnets-by-correlated-magnetics-can-change-engineering.html>.
Kim et al., "Printing Ferromagnetic Domains for Untethered Fast-Transforming Soft Materials", Nature, vol. 558, Jun. 14, 2018, 26 pages.

* cited by examiner

*Primary Examiner* — Ian A Rummel
(74) *Attorney, Agent, or Firm* — Stosch Sabo

(57) ABSTRACT

Described are techniques for additive manufacturing with magnetic manipulation. The techniques including a method comprising performing additive manufacturing using a material containing a ferromagnetic additive to create a component. The method further comprises, during the additive manufacturing, generating a magnetic field near a portion the component, where the magnetic field causes the portion of the component to deform during the additive manufacturing based on the material containing the ferromagnetic additive.

19 Claims, 6 Drawing Sheets

ADDITIVE MANUFACTURING WITH MAGNETIC MANIPULATION

BACKGROUND

The present disclosure relates to additive manufacturing, and, more specifically, to additive manufacturing with magnetic manipulation.

Additive manufacturing includes manufacturing techniques such as three-dimensional (3D) printing. In 3D printing, material is deposited layer-by-layer to create a component. 3D printing can be useful in applications such as prototype manufacturing and custom manufacturing of any number of parts. Further, 3D printing can be useful in applications requiring unique, delicate, complex, and/or interior geometries that are more efficient to manufacture using 3D printing than other manufacturing techniques.

SUMMARY

Aspects of the present disclosure are directed toward a method comprising performing additive manufacturing using a material containing a ferromagnetic additive to create a component. The method further comprises, during the additive manufacturing, generating a magnetic field near a portion the component, where the magnetic field causes the portion of the component to deform during the additive manufacturing based on the material containing the ferromagnetic additive Additional aspects of the present disclosure are directed to systems and computer program products configured to perform the method described above.

Further aspects of the present disclosure are directed toward a three-dimensional printer comprising a platform and a nozzle for printing a component on the platform using a material containing a ferromagnetic additive. The three-dimensional printer further comprises a plurality of inductors surrounding the platform, where the plurality of inductors is configured to receive electricity during printing the component to deform the component by generating a magnetic field that interacts with the ferromagnetic additive.

Further aspects of the present disclosure are directed to a component comprising a first portion fabricated by three-dimensional printing using a thermoplastic. The component further comprises an unsupported portion fabricated by three-dimensional printing using a thermoplastic with a ferromagnetic additive. The component further comprises a surface portion fabricated by three-dimensional printing using a thermoplastic with a plurality of concentrations of the ferromagnetic additive corresponding to surface texture features of the surface portion.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1B:
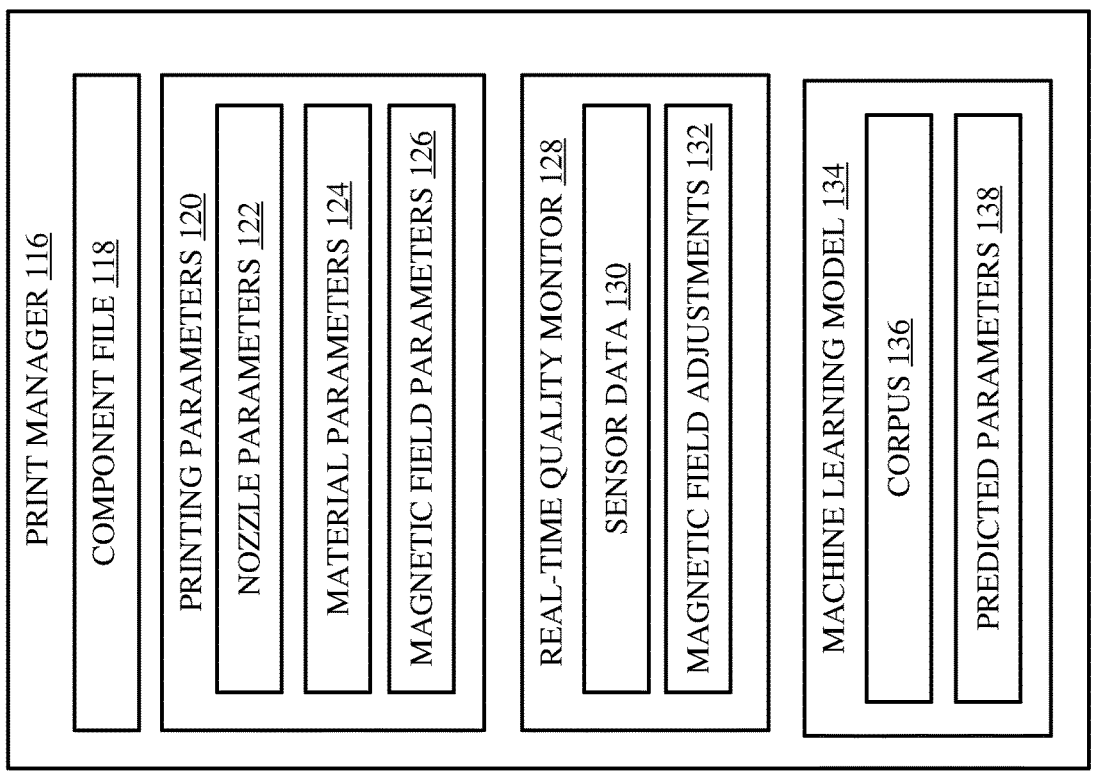
FIG. 1B illustrates a block diagram of an example print manager of a 3D printer, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward additive manufacturing, and, more specifically, to additive manufacturing with magnetic manipulation. While not limited to such applications, embodiments of the present disclosure may be better understood in light of the aforementioned context.

Additive manufacturing (also referred to as three-dimensional (3D) printing) involves receiving a computer-aided design (CAD) model, parsing the CAD model into numerous layers, and then printing each layer sequentially to physically manufacture a component based on the CAD model. The printing can function by any number of techniques and processes that are configured to fuse, join, or otherwise combine material. For example, 3D printing can be performed by vat photopolymerization, material jetting, binder jetting, powder bed fusion, material extrusion, directed energy deposition, sheet lamination, and/or other 3D printing techniques.

A variety of materials can be used in manufacturing. These materials can include thermoplastics that are heated to a flowing point, deposited according to the layer-by-layer deposition protocol, and allowed to cool to solidify and bind with any adjacent material. In some situations, multiple materials are used, or similar materials are used with different modifiers for color, strength, magnetism, and/or other customized aesthetic or structural properties.

Aspects of the present disclosure are directed to a 3D printer including inductors surrounding all or part of a printing platform of the 3D printer. The inductors can function as magnets when supplied with electricity. Aspects of the present disclosure are further directed to utilizing a material that is responsive to a magnetic field (e.g., a thermoplastic loaded with a ferromagnetic additive) for at least a portion of a component being printed. Aspects of the present disclosure are directed to depositing the material that is responsive to the magnetic field in the component during 3D printing. Further aspects of the present disclosure are directed to supplying electricity to the inductors throughout the 3D printing of the component in order to generate a magnetic field that manipulates portions of the component having the material that is responsive to the magnetic field. Supplying a magnetic field to a component that is being manufactured from a material loaded with a ferromagnetic additive has many possible uses including, but not limited to:

(i) Error Correction: A magnetic field can be used to correct an out-of-tolerance feature. For example, an approximately cube-shaped component should have four edges that are vertical to the printing platform. However, during printing, one or more of these edges may drift out of vertical alignment. Aspects of the present disclosure can supply a magnetic field to the component that has the ferromagnetic additive distributed throughout the component to correct the misalignment. Doing so increases efficiency by reducing scrap rates associated with otherwise unsalvageable out-of-tolerance components.

(ii) Surface Texture: A magnetic field can be used to create a custom surface texture on a 3D printed component. For example, custom knurling, threading, surface roughness, patterning, or other surface textures may be more efficiently realized by applying a magnetic field to an approximately smooth surface having some ferromagnetic material distributed therein rather than individually printing the custom knurling, threading, surface roughness, or patterning.

(iii) Custom Geometry: A magnetic field can be used to create custom geometries that may otherwise not be practical to print. For example, consider a 3D printed component approximating two structures having a catenary wire hanging between them. The catenary wire is difficult to 3D print because it depends on its attachment to both adjacent structures to provide structural support. Further, the structural properties of the material in its cooled state may be sufficient to support the structure, however, the structural properties of the material are degraded in a heated state (e.g., the state at which the material is deposited). Thus, using traditional 3D printing techniques, partway through printing the catenary wire, the catenary wire would likely collapse as a result of the gravitational force acting on the catenary wire and the degraded structural properties of the heated material. However, aspects of the present disclosure recognize that a catenary wire 3D printed with a material containing a ferromagnetic additive and exposed to a magnetic field during the printing may reduce or cancel the collapsing gravitational force and allow the catenary wire to be suspended while finishing 3D printing.

Thus, incorporating magnetic fields into 3D printing with materials having ferromagnetic additives has numerous applications and benefits that reduce material waste, reduce manufacturing time, and enable otherwise impractical geometries to be fabricated by 3D printing.

Although the present disclosure primarily discusses a magnetic field generated from one or more inductors placed proximate to a 3D printer, alternative embodiments include alternative components configured to generate different types of external forces to manipulate a component while it is being printed by a 3D printer. Such different forces could include, for example, an electric force or an electrostatic force that can manipulate a component. In this example, instead of a ferromagnetic additive, the component can be selectively loaded with an insulative additive that is useful for generating and/or holding a surface charge. Likewise, instead of inductors generating a magnetic field, this example can utilize electrostatic generators or electrostatic motors (e.g., machines configured to generate relatively high voltages at relatively low electrical currents) capable of generating an electric field or electric charge that can be used to deform a component during 3D printing. Thus, there are numerous alternative external forces that are within the spirit and scope of the present disclosure although they may not be discussed at length.

Figure 1A:
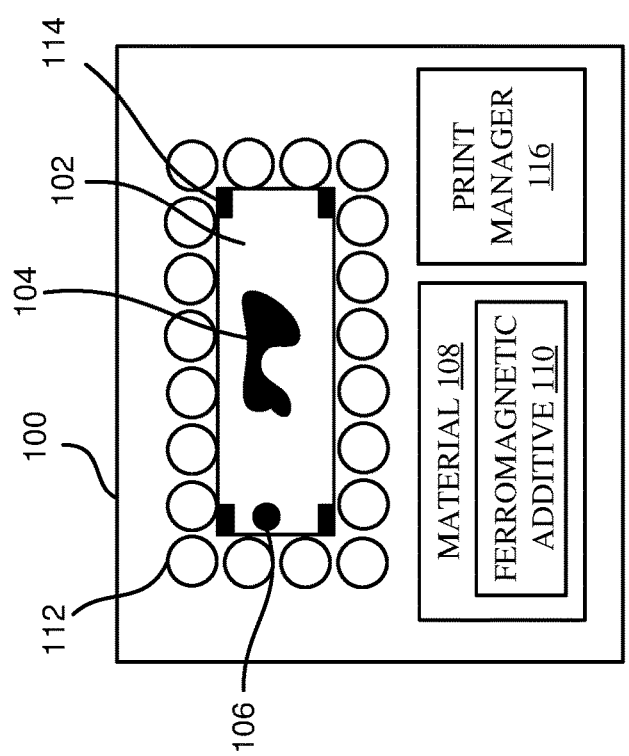
FIG. 1A illustrates a block diagram of an example three-dimensional (3D) printer, in accordance with some embodiments of the present disclosure.

Referring now to the figures, FIG. 1A illustrates a block diagram of a top view of an example 3D printer 100, in accordance with some embodiments of the present disclosure. 3D printer 100 includes a platform 102 upon which a component 104 is created using layer-by-layer deposition of a material 108 from a nozzle 106. The nozzle 106 can be configured to deposit material 108 at a predetermined feed rate using an orifice of predetermined size with a predetermined backpressure and at a predetermined temperature. The nozzle 106 can articulate in three dimensions using, for example, a ball-and-socket where the nozzle 106 is attached by an extendable and retractable arm and may move about platform 102 in all three dimensions. In another example, the nozzle 106 can move in three dimensions using a track system whereby, for example, the track moves forward and backward in the y-direction, the nozzle 106 traverses the track in the x-direction, and the track extends and retracts in the z-direction. These are only examples of nozzle 106, and nozzle 106 can include any nozzle architecture and articulating apparatus now known or later developed.

Material 108 can include any type of material suitable for additive manufacturing. Some non-limiting examples of material 108 can include acrylonitrile butadiene styrene (ABS), thermoplastic elastomers (TPEs), thermoplastic urethanes (TPUs), poly-lactic acid (PLA), polystyrene (PS), high-impact polystyrene (HIPS), polyethylene (PE), polyethylene terephthalate (PET), polyethylene terephthalate glycol-modified (PETG), polypropylene (PP), nylon, acrylonitrile styrene acrylate (ASA), polycarbonate (PC), polyvinyl alcohol (PVA), and others. In some embodiments, material 108 can include a combination of two or more materials (e.g., a composite, a polymer blend, etc.). Although not explicitly shown, the material 108 can include any number of additives useful for improving processability, improving longevity, or improving mechanical, electrical, or temperature properties. For example, the material 108 can include plasticizers, nucleating agents, desiccants, impact modifiers, chain extenders, stabilizers, carboxyl scavengers, fillers (e.g., mineral, wood, metal, aramid, carbon, graphite, etc.), and the like.

Material 108 includes a ferromagnetic additive 110 that is either uniformly distributed throughout material 108 or selectively added to predetermined quantities of material 108. For example, the material 108 can have distributed therein a ferromagnetic additive 110 such as iron, nickel, cobalt, awaruite, wairauite, or another material with ferromagnetic properties. Ferromagnetic additive 110 can be in particle, platelet, rod, short-fiber, long-fiber, and/or continuous-fiber form. Ferromagnetic additive 110 can be incorporated into material 108 at a predetermined loading percentage by weight. For example, the ferromagnetic additive 110 can be loaded into material 108 at a weight percent of between and including 0.5% to 5.0% and/or between 5.0% and 30.0%. In other embodiments, other amounts of loading, such as less than 0.5% or more than 30.0% are possible.

In embodiments where the ferromagnetic additive 110 is approximately uniformly distributed throughout the material 108, the material 108 can be purchased having the desired loading weight of ferromagnetic additive 110, or the material 108 can be custom compounded with a ferromagnetic additive 110 to achieve a desired loading weight. Loading weight can be defined as the weight of ferromagnetic additive 110 divided by the sum of the weight of ferromagnetic additive 110 together with material 108. Although weight is discussed above, the amount of ferromagnetic additive 110 can also be characterized as a function of volume (e.g., loading volume).

In embodiments where the ferromagnetic additive 110 is selectively distributed in portions of the component 104, then the ferromagnetic additive can be selectively incorporated into material 108 at the nozzle 106, in a barrel prior to the nozzle 106, and/or in a hopper feeding the barrel leading to the nozzle 106.

In other embodiments, the 3D printer 100 utilizes a first material 108 that is not ferromagnetic and a second material 108 that includes a ferromagnetic additive 110. In these embodiments, the nozzle 106 can switch between materials (or there can be two nozzles 106—one for each material).

3D printer 100 further includes a plurality of inductors 112 surrounding the platform 102. Inductors 112 can refer to coils, chokes, or reactors that function as passive two-terminal electrical components that store energy in the form of a magnetic field when supplied with an electrical current. In some embodiments, each of the inductors 112 includes an insulated wire wound around a core. The inductors 112 shown in FIG. 1A are purely for illustrative purposes and more or fewer inductors 112 are utilized in alternative embodiments. Furthermore, although a single layer of inductors 112 are shown, in some embodiments, inductors 112 are arranged in all three dimensions about platform 102. Inductors 112 can include, but are not limited to, air core inductors, iron core inductors, ferrite core inductors (e.g., soft ferrite or hard ferrite), iron powder inductors, laminated core inductors, bobbin-based inductors, toroidal inductors, multi-layer ceramic inductors, film inductors, variable inductors, coupled inductors, and/or other inductors.

3D printer 100 further includes sensors 114 proximate to the platform 102 for monitoring fabrication of the component 104. The sensors 114 can be, for example, cameras collecting optical data, lasers collecting distance data (which can be used to generate a 3D representation of the component 104 as it is being printed), and/or other sensors. Although four sensors 114 are shown in corners of platform 102, more or fewer sensors 114 in similar or different locations fall within the spirit and scope of the present disclosure.

3D printer 100 further includes print manager 116. Print manager 116 is a combination of hardware and software configured to control nozzle 106 for printing component 104 by additive manufacturing using a material 108 having a ferromagnetic additive 110. Print manager 116 can intermittently supply electrical current to inductors 112 to enable, expedite, or otherwise improve manufacturing of the component 104 by use of magnetic fields that deform, support, or otherwise manipulate the component 104. In some embodiments, print manager 116 utilizes data from sensors 114 to correct out-of-tolerance features of the component 104 while it is being printed.

FIG. 1B illustrates an example of print manager 116, in accordance with some embodiments of the present disclosure. Print manager 116 can include a component file 118, printing parameters 120, real-time quality monitor 128, and a machine learning model 134. Component file 118 can be, for example, a CAD model of the component 104 that is stored in, for example, a stereolithography (STL) file format. Component file 118 can include information related to dimensions, tolerances, features, materials, and the like.

Print manager 116 further includes printing parameters 120 which can include nozzle parameters 122, material parameters 124, and/or magnetic field parameters 126. Nozzle parameters 122 can include, but are not limited to, nozzle speed, nozzle feed rate, nozzle back pressure, nozzle temperature, nozzle path, and/or nozzle orifice size and/or geometry.

Material parameters 124 can include, but are not limited to, material properties for one or more materials 108 such as a material type, a material melting point, a material glass transition temperature, a rheological profile of the material (e.g., viscosity, viscosity as a function of shear rate, etc.), a material elasticity profile as a function of temperature, a ferromagnetic additive 110 loading weight, and the like. A material melting point can be useful for defining nozzle temperature in nozzle parameters 122. A rheological profile of the material can be useful for defining nozzle feed rate, nozzle back pressure, and/or nozzle orifice size and/or geometry. Likewise, the material elasticity profile as a function of temperature can be useful for determining how to utilize magnetic fields to manipulate the component 104 that is being printed. For example, print manager 116 could heat a portion of a partially printed component 104 from a first temperature to a second temperature in order to make that component more malleable within a magnetic field given a higher degree of elasticity at the second temperature than the first temperature.

In some embodiments, material parameters 124 can further include information defining where to supply ferromagnetic additive 110 in component 104 so that the component 104 can benefit from magnetic field manipulation during fabrication. For example, material parameters 124 can include a higher concentration of ferromagnetic additive 110 in an unsupported portion of component 104. As another example, material parameters 124 can include a patterned arrangement of concentrations of ferromagnetic additive 110 between and including 0.1 millimeters and 3.0 millimeters from a surface of the component 104 in order to create a certain surface texture on the component 104.

Magnetic field parameters 126 can include, but are not limited to, for each inductor 112, an amount of electrical current to provide to the inductor 112 and a time interval during which to provide the electrical current. In embodiments where individual inductors 112 are movable about platform 102, the magnetic field parameters 126 can further include location information for each inductor 112. In embodiments where the inductors 112 can shape, manipulate, or otherwise direct the magnetic field, the magnetic field parameters 126 can further include directionality information useful for directing the magnetic field.

Print manager 116 can further include real-time quality monitor 128 including sensor data 130 and magnetic field adjustments 132. Real-time quality monitor 128 can be configured to measure accuracy of the component 104 as it is printed relative to the specifications of the component (e.g., as stored in the component file 118). Sensor data 130 can be received from one or more sensors 114 and can be used to compare a progress of printing the component 104 to the component file 118 for determining if there are any out-of-tolerance features of the partially printed component 104. Magnetic field adjustments 132 can include electric current profiles sent to various inductors 112 during printing to correct out-of-tolerance features by deforming all or a portion of the component 104.

Print manager 116 further includes machine learning model 134. Machine learning model 134 can be based on a corpus 136 of data related to magnetic manipulation of various materials 108 that are associated with a ferromagnetic additive 110 for various geometries of various components 104. Machine learning model 134 can be used to generate one or more predicted parameters 138. For example, predicted parameters 138 can relate to nozzle parameters 122, material parameters 124, magnetic field parameters 126, and/or magnetic field adjustments 132.

Machine learning model 134 can comprise algorithms or models that are generated by performing supervised, unsupervised, or semi-supervised training on a dataset, and subsequently applying the generated algorithm or model to predict appropriate printing parameters 120 and/or appropriate magnetic field adjustments 132.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 2:
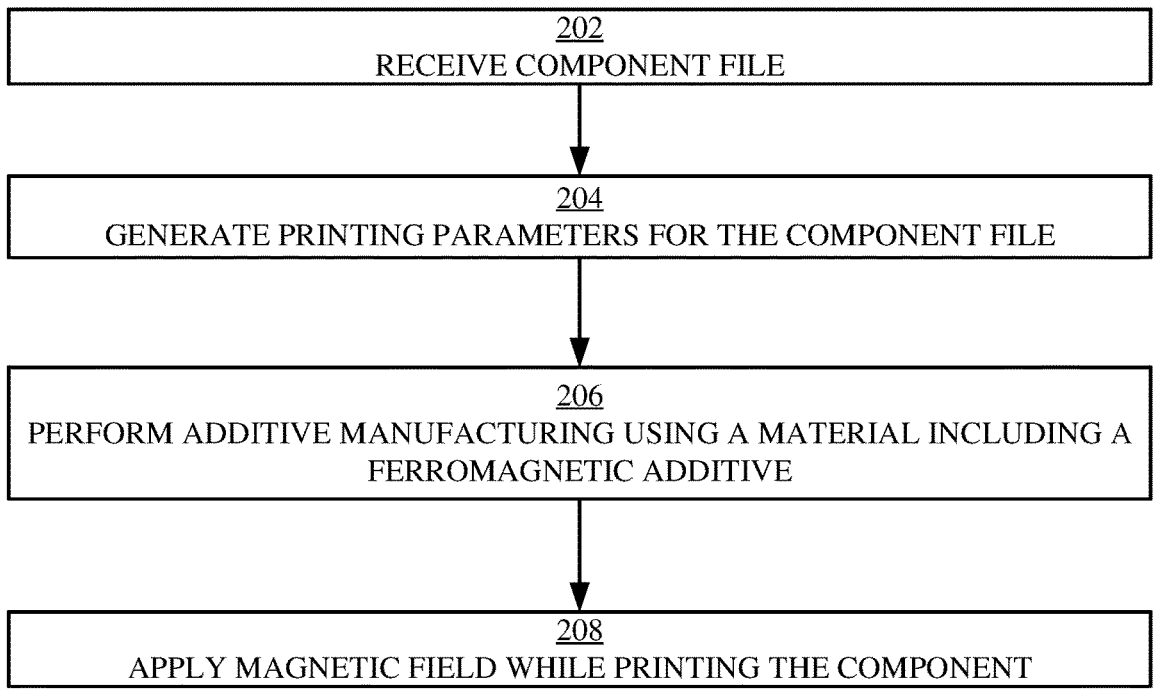
FIG. 2 illustrates a flowchart of an example method for performing additive manufacturing with magnetic manipulation, in accordance with some embodiments of the present disclosure.

FIG. 2 illustrates a flowchart of an example method 200 for performing additive manufacturing using magnetic manipulation, in accordance with some embodiments of the present disclosure. The method 200 can be performed by, for example, a 3D printer 100 or a different configuration of hardware and/or software.

Operation 202 includes receiving a component file 118 of a component 104 for printing. Operation 204 includes generating printing parameters 120 for the component file 118. Printing parameters 120 can include one or more of nozzle parameters 122, material parameters 124, and/or magnetic field parameters 126.

In some embodiments, generating printing parameters 120 in operation 204 includes utilizing machine learning model 134 to generate predicted parameters 138 such as a prediction of one or more of the printing parameters 120. For example, operation 204 can further include inputting the component file 118 to the machine learning model 134 and receiving from the machine learning model 134 one or more of nozzle parameters 122, material parameters 124, and/or magnetic field parameters 126.

Operation 206 includes performing additive manufacturing using a material 108 that includes a ferromagnetic additive 110. In some embodiments, operation 206 includes performing additive manufacturing using a material 108 that is approximately uniformly distributed with ferromagnetic additive 110. In other embodiments, operation 206 includes performing additive manufacturing using a material 108 that is selectively loaded with ferromagnetic additive 110. In the latter case (e.g., material 108 selectively loaded with ferromagnetic additive 110), the ferromagnetic additive 110 can be exclusively deposited on predetermined portions of the component 104 or the ferromagnetic additive 110 can be compounded together with the material 108 to a predetermined loading weight and the compounded material can then be deposited at predetermined portions of the component 104.

Operation 208 includes applying a magnetic field while printing the component 104. In some embodiments, the magnetic field is applied using one or more inductors 112 surrounding the platform 102 of the 3D printer 100. The magnetic field can be applied to deform, support, or otherwise manipulate the component 104. In some embodiments, the magnetic field is applied to correct an out-of-tolerance feature of the component 104 by deforming the component 104 until it is within tolerance of the certain feature (discussed hereinafter with respect to FIG. 3). In some embodiments, the magnetic field is applied in order to enable printing of an otherwise structurally unsupported portion of the component 104 by using the magnetic field to support the unsupported portion (discussed hereinafter with respect to FIG. 4). In some embodiments, the magnetic field is applied to provide a surface texture to the component 104 by selectively deforming portions of a surface of the component 104 (discussed hereinafter with respect to FIG. 5).

Figure 3:
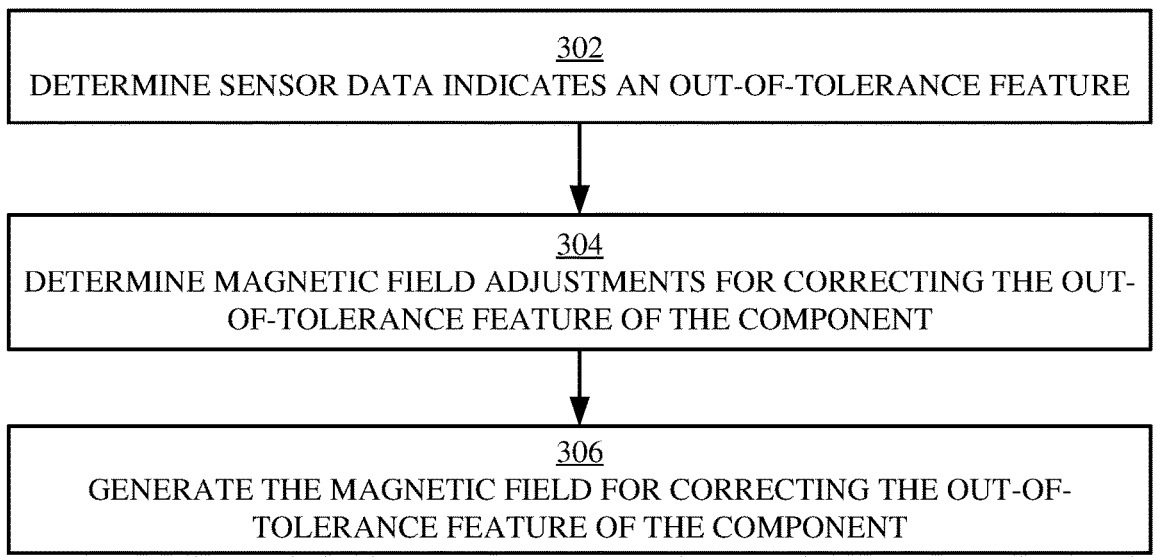
FIG. 3 illustrates a flowchart of an example method for correcting an out-of-tolerance feature using a magnetic field during 3D printing, in accordance with some embodiments of the present disclosure.

FIG. 3 illustrates a flowchart of an example method 300 for correcting an out-of-tolerance feature of a component during printing using a magnetic field, in accordance with some embodiments of the present disclosure. In some embodiments, the method 300 is a sub-method of operation 208 of FIG. 2. In some embodiments, the method 300 is implemented by a 3D printer 100 or a different configuration of hardware and/or software.

Operation 302 includes determining that sensor data 130 received from sensors 114 indicates that a feature of the component 104 is out-of-tolerance. In some embodiments, operation 302 includes comparing the sensor data 130 from sensors 114 with the component file 118 to determine inconsistencies between the partially printed component 104 and the component file 118 that indicate an out-of-tolerance feature.

Operation 304 includes determining magnetic field adjustments 132 for correcting the out-of-tolerance feature on the partially printed component 104. Determining the magnetic field adjustments 132 can include determining an electric current to provide to respective inductors 112 and further determining a time interval during which to provide the electric current to the respective inductors 112.

In some embodiments, operation 304 utilizes machine learning model 134 to generate predicted parameters 138 related to magnetic field adjustments 132. In such embodiments, operation 304 can include providing the sensor data 130 and the component file 118 to the machine learning model 134 and receiving predicted parameters 138 from the machine learning model 134, where the predicted parameters 138 relate to the magnetic field adjustments 132.

Operation 306 includes generating the magnetic field according to the magnetic field adjustments 132 for correcting the out-of-tolerance feature on the partially printed component 104. In some embodiments, operation 306 includes heating a portion of the component 104 prior to, or contemporaneously with, generating the magnetic field in order to realize a desired elasticity of the material of component 104 during interaction between the magnetic field and the ferromagnetic additive 110 in component 104.

Although not explicitly shown, the method 300 can further include iterating through the method 300 and making further adjustments to the magnetic field adjustments 132 according to the detected changes in the partially printed component 104. For example, the method 300 can repeat to increase the strength of the magnetic field, decrease the strength of the magnetic field, and/or alter amounts and intervals of electricity sent to various inductors 112.

Figure 4:
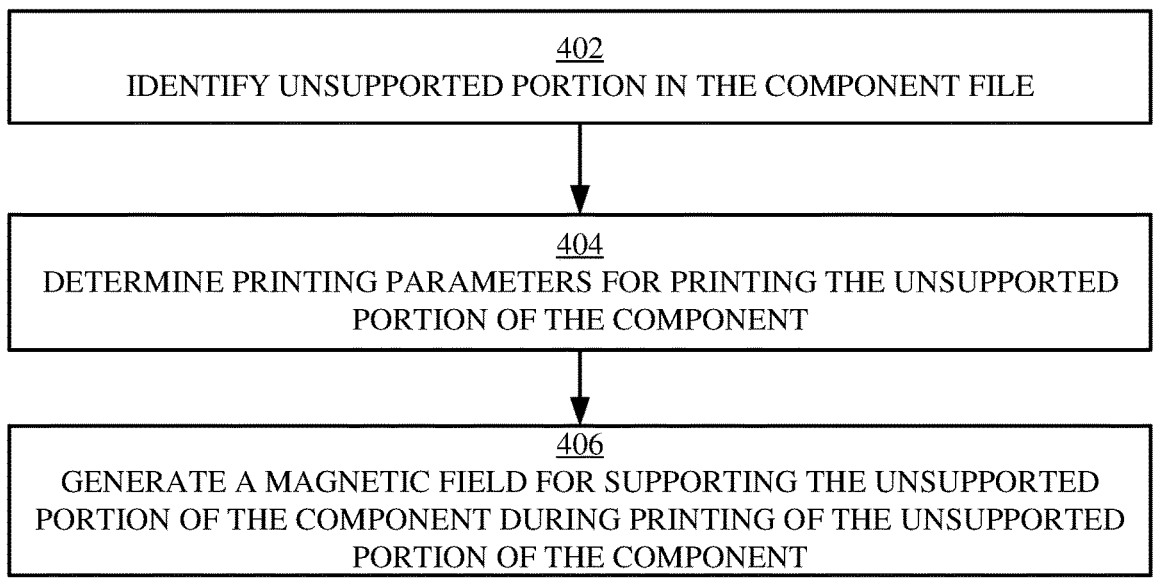
FIG. 4 illustrates a flowchart of an example method for printing an unsupported portion of a component using a magnetic field during 3D printing, in accordance with some embodiments of the present disclosure.

FIG. 4 illustrates a flowchart of an example method 400 for printing an unsupported portion of component 104 using a magnetic field, in accordance with embodiments of the present disclosure. In some embodiments, the method 400 is a sub-method of operation 208 of FIG. 2. In some embodiments, the method 400 is implemented by a 3D printer 100 or a different configuration of hardware and/or software.

Operation 402 includes identifying an unsupported portion in a component file 118. The unsupported portion can be defined as a portion having neither the platform 102 nor any other aspect of component 104 underneath the portion for a length exceeding a support ratio (e.g., such that without additional support provided by an element of 3D printer 100 and/or a physical feature other than component 104, the unsupported element is liable or certain to collapse at an intermediate stage of manufacturing). The support ratio can be based on material properties such as weight and flexural modulus as a function of temperature. For example, some materials can successfully "build out" an unsupported portion layer-by-layer so long as the increments are small and sufficient time is allowed for each layer to cool enough to provide some structural support to the next layer. As another example, an unsupported portion can be defined as a feature of component 104 that has a length-to-thickness ratio that exceeds (e.g., is greater than or equal to) a length-to-thickness threshold at an angular deviation from vertical (e.g., where vertical can be the axis that is orthogonal to the platform 102) that exceeds (e.g., is greater than or equal to) an angle threshold. In other words, features that are relatively narrow and long are more likely to collapse during 3D printing. Further, features that are relatively more displaced from vertical are more likely to collapse during 3D printing.

In such embodiments, a length-to-thickness ratio can be defined as a length of a thin section divided by a characteristic of the cross-section of the thin section. The characteristic of the cross-section of the thin section can be a width, a height, a diameter, a cross-sectional area, a moment of inertia, or another characteristic useful for understanding the thin section's likelihood of collapse during 3D printing. The length-to-thickness threshold can be, for example, in the inclusive range of 2-10. Likewise, the angle threshold can be, for example, greater than 15°, greater than 30°, or in the inclusive range of 30°-70°.

Operation 404 includes determining printing parameters 120 for printing the unsupported portion of the component. Operation 404 can include defining material parameters 124 that include material 108 with ferromagnetic additive 110 at the unsupported portion of the component 104. Further, operation 404 can include defining magnetic field parameters 126 for generating a magnetic field that will generally counter the gravitational force acting on the unsupported portion of the component 104 during printing of the unsupported portion of the component 104. In some embodiments, operation 404 includes utilizing machine learning model 134, where operation 404 can include inputting the component file 118 to the machine learning model 134 and receiving predicted parameters 138 related to the aforementioned material parameters 124 and/or magnetic field parameters 126 from the machine learning model 134.

Operation 406 includes generating a magnetic field utilizing inductors 112 for supporting the unsupported portion of the component 104 during printing of the unsupported portion of the component 104. In some embodiments, operation 406 includes heating a portion of the component 104 prior to, or contemporaneously with, generating the magnetic field in order to realize a desired elasticity of the material of component 104 during interaction between the magnetic field and the ferromagnetic additive 110 in component 104.

A component 104 fabricated by additive manufacturing using a magnetic field can exhibit various residual indicators of the magnetic field. For example, for a component 104 comprising a material 108 such as a thermoplastic, where at least a portion of the thermoplastic contains a ferromagnetic additive 110, then the component 104 can exhibit a relatively higher concentration of ferromagnetic additive 110 in an unsupported portion of the component 104 relative to other portions of the component 104. Further, the unsupported portion of the component 104 can exhibit a relatively higher variation of concentration of the ferromagnetic additive 110 relative to the remainder of the component 104 as a result of the ferromagnetic additive 110 migrating through the unsupported portion of the component 104 and toward the source of the magnetic field. In such cases, an upper portion of the unsupported portion can have a higher concentration of ferromagnetic additive 110 than a lower portion of the unsupported portion of the component 104. Finally, in embodiments where the ferromagnetic additive 110 exhibits symmetry in fewer than three dimensions (e.g., rods, platelets, fibers), the ferromagnetic additive 110 can exhibit a higher degree of alignment in the unsupported portion of the component 104 relative to the other portions of the component 104 as a result of the magnetic field.

Figure 5:
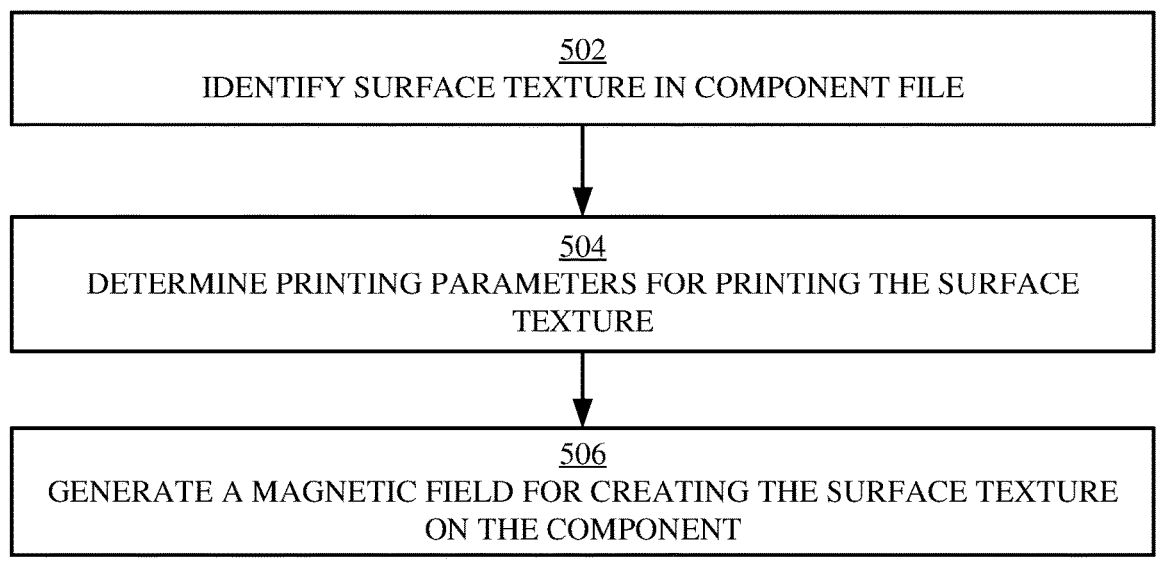
FIG. 5 illustrates a flowchart of an example method for creating a surface texture on a component using a magnetic field during 3D printing, in accordance with some embodiments of the present disclosure.

FIG. 5 illustrates a flowchart of an example method 500 for creating a surface texture on a component 104 using a magnetic field, in accordance with embodiments of the present disclosure. In some embodiments, the method 500 is a sub-method of operation 208 of FIG. 2. In some embodiments, the method 500 is implemented by a 3D printer 100 or a different configuration of hardware and/or software.

Operation 502 includes identifying a surface texture for the component 104 based on the component file 118. In some embodiments, the component file 118 itself contains a physical representation of the surface texture. In other embodiments, the component file 118 includes information defining the surface texture (e.g., a surface roughness measure, a knurling pattern, etc.).

Operation 504 includes determining printing parameters 120 for printing the surface texture. In some embodiments, operation 504 includes defining material parameters 124 that include a distribution pattern for ferromagnetic additive 110 within component 104 for creating the surface texture. For example, material parameters 124 can indicate a pattern of concentrations of ferromagnetic additive 110 a predetermined amount beneath the surface of the component 104 such that, upon exposure to a magnetic field, the pattern of concentrations of ferromagnetic additive 110 will be pulled to (or pushed from) the magnetic field, thereby modifying of the surface of the component 104 by creating depressions and/or protrusions near the concentrations of ferromagnetic additive 110. In some embodiments, concentrations of ferromagnetic additive 110 include a predefined amount of ferromagnetic additive 110 deposited in a predefined geometry (e.g., sphere, cube, tear drop, etc.) at predefined locations in component 104. In some embodiments, the concentrations of ferromagnetic additive 110 are deposited in an inclusive range of between 0.1 millimeters and 3.0 millimeters below the surface of the component 104.

In some embodiments, operation 504 includes utilizing machine learning model 134, where operation 504 can include inputting the component file 118 to the machine learning model 134 and receiving predicted parameters 138 related to the aforementioned material parameters 124 and/or magnetic field parameters 126 from the machine learning model 134.

Operation 506 includes generating a magnetic field for influencing the ferromagnetic additive 110 within component 104 in order to create a surface texture. In some embodiments, operation 506 includes heating a portion of the component 104 prior to, or contemporaneously with, generating the magnetic field in order to realize a desired elasticity of the material of component 104 during interaction between the magnetic field and the ferromagnetic additive 110 in the component 104.

A component 104 with a surface texture created by a magnetic field can exhibit various residual indicators of the magnetic field such as, but not limited to, a higher concentration of ferromagnetic additive 110 near a surface of the component 104 (e.g., within 0.1 millimeters to 3.0 millimeters of the surface) relative to other portions of the component 104. In some embodiments, a concentration of ferromagnetic additive 110 can be located beneath one or more protrusions or depressions in the surface texture. In other words, concentrations of ferromagnetic additive 110 can correspond to surface texture features of component 104.

Figure 6:
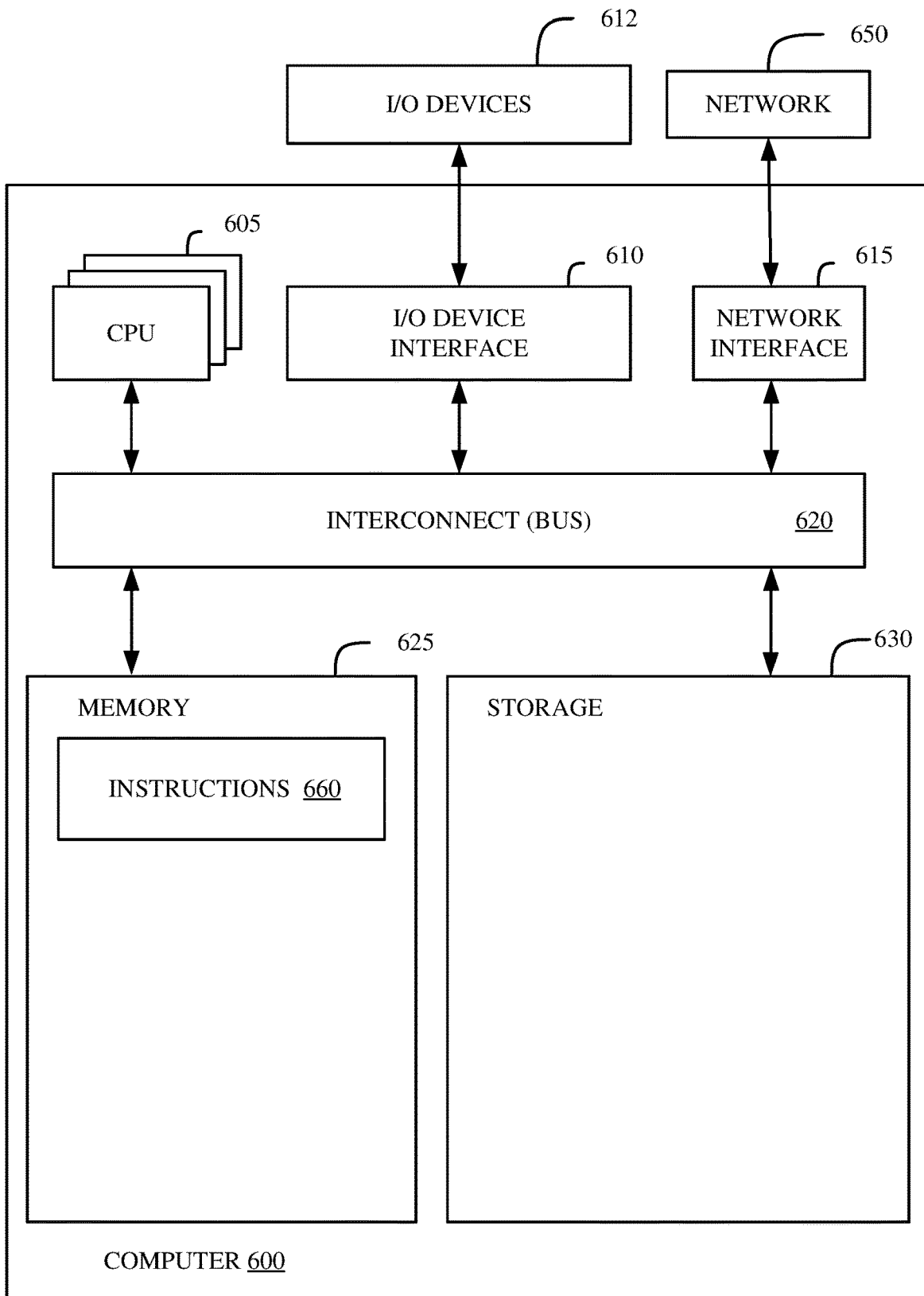
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in FIGS. 2-5 and/or implement the functionality discussed in FIG. 1. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into 3D printer 100 (e.g., as print manager 116 of FIGS. 1A and 1B).

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be processor-executable instructions for performing any portion of, or all of, any of the methods of FIGS. 2-5 and/or implementing any of the functionality discussed in FIG. 1.

Although not explicitly shown, storage 630 can include elements discussed in FIG. 1B, such as, but not limited to, component file 118, printing parameters 120 (including nozzle parameters 122, material parameters 124, and/or magnetic field parameters 126), real-time quality monitor 128 (including sensor data 130 and/or magnetic field adjustments 132), and/or machine learning model 134 (including corpus 136 and/or predicted parameters 138).

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-5 and/or any of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

In order to better clarify various aspects of the present disclosure, several non-limiting examples of various embodiments of the present disclosure will now be discussed.

Example 1: a method comprising performing additive manufacturing using a material containing a ferromagnetic additive to create a component, and, during the additive manufacturing, generating a magnetic field near a portion the component, the magnetic field causing the portion of the component to deform during the additive manufacturing based on the material containing the ferromagnetic additive.

Example 2: the method of example 1, wherein performing the additive manufacturing occurs on a platform of a three-dimensional printer having a plurality of inductors surrounding the platform, and wherein generating the magnetic field includes supplying electricity to at least one inductor of the plurality of inductors.

Example 3: the method of example 2, wherein the three-dimensional printer further includes a plurality of sensors configured to monitor accuracy of the component as it is printed, wherein the method further comprises determining, based on the plurality of sensors, that the portion of the component is out-of-tolerance; and wherein the magnetic field is configured to deform the portion of the component to be within tolerance.

Example 4: the method of example 3, wherein the plurality of sensors comprise optical cameras.

Example 5: the method of example 3, wherein the plurality of sensors comprise lasers.

Example 6: the method of any of examples 1-5, wherein the magnetic field is configured to cause a change in a surface texture of the component based on the material containing the ferromagnetic additive.

Example 7: the method of example 6, wherein the ferromagnetic additive is distributed in respective concentrations at predefined locations near a surface of the component.

Example 8: the method of example 7, wherein the respective concentrations of the ferromagnetic additive are within an inclusive range of 0.1 millimeters to 3 millimeters from the surface of the component.

Example 9: the method of any of examples 1-8, wherein the portion of the component is structurally unsupported, and wherein the magnetic field is configured to support the portion of the component based on the material containing the ferromagnetic additive.

Example 10: the method of example 9, wherein the magnetic field is configured to counteract a gravitational force of the portion of the component that is structurally unsupported during the additive manufacturing.

Example 11: the method of example 10, wherein the portion of the component comprises a length-to-thickness ratio that exceeds a length-to-thickness threshold and an angle relative to vertical that exceeds an angle threshold.

Example 12: the method of any of examples 1-11, wherein the ferromagnetic additive is selected from a group consisting of: iron, nickel, cobalt, awaruite, wairauite.

Example 13: the method of example 12, wherein the material comprises a thermoplastic compounded with the ferromagnetic additive to achieve a loading weight.

Example 14: the method of example 13, wherein the loading weight of ferromagnetic additive in the thermoplastic is within an inclusive range of 0.1% and 5.0%.

Example 15: the method of example 13, wherein the loading weight of ferromagnetic additive in the thermoplastic is within an inclusive range of 5.0% to 30.0%.

Example 16: a three-dimensional printer comprising a platform, a nozzle for printing a component on the platform using a material containing a ferromagnetic additive, and a plurality of inductors surrounding the platform, the plurality of inductors configured to receive electricity during printing the component to deform the component by generating a magnetic field that interacts with the ferromagnetic additive.

Example 17, the three-dimensional printer of example 16, further comprising a plurality of sensors proximate to the platform, wherein the plurality of sensors are configured to identify an out-of-tolerance feature of the component during printing.

Example 18: a component comprising a first portion fabricated by three-dimensional printing using a thermoplastic, an unsupported portion fabricated by three-dimensional printing using a thermoplastic with a ferromagnetic additive, and a surface portion fabricated by three-dimensional printing using a thermoplastic with a plurality of concentrations of the ferromagnetic additive corresponding to surface texture features of the surface portion.

Example 19: the component of example 18, wherein the ferromagnetic additive in the unsupported portion is aligned according to interaction with a magnetic field during fabrication, wherein the unsupported portion includes a length-to-thickness ratio that is greater than 2 and a deviation from vertical that is greater than 30°.

Example 20: The component of example 18 or 19, wherein respective concentrations of the ferromagnetic additive are between 0.1 millimeters and 3.0 millimeters below respective protrusions on the surface portion.

What is claimed is:

1. A method comprising:
   performing additive manufacturing using a material containing a ferromagnetic additive to create a component; and
   during the additive manufacturing, generating a magnetic field near a portion of the component that is structurally unsupported, and wherein the magnetic field supports and deforms the portion of the component during the additive manufacturing based on the material containing the ferromagnetic additive.

2. The method of claim 1, wherein performing the additive manufacturing occurs on a platform of a three-dimensional printer having a plurality of inductors surrounding the platform, and wherein generating the magnetic field includes supplying electricity to at least one inductor of the plurality of inductors.

3. The method of claim 2, wherein the three-dimensional printer further includes a plurality of sensors configured to monitor accuracy of the component as it is printed, wherein the method further comprises:
   determining, based on the plurality of sensors, that the portion of the component is out-of-tolerance; and
   wherein the electricity is supplied to the at least one inductor such that the magnetic field is configured to deform the portion of the component to be within tolerance.

4. The method of claim 3, wherein the plurality of sensors comprise optical cameras.

5. The method of claim 3, wherein the plurality of sensors comprise lasers.

6. The method of claim 1, wherein the magnetic field is configured to cause a change in a surface texture of the component based on the material containing the ferromagnetic additive.

7. The method of claim 6, wherein the ferromagnetic additive is distributed in respective concentrations at predefined locations near a surface of the component.

8. The method of claim 7, wherein the respective concentrations of the ferromagnetic additive are within an inclusive range of 0.1 millimeters to 3 millimeters from the surface of the component.

9. The method of claim 1, wherein the magnetic field is configured to counteract a gravitational force of the portion of the component that is structurally unsupported during the additive manufacturing.

10. The method of claim 9, wherein the magnetic field is generated as a result of the portion of the component comprising a length-to-thickness ratio that exceeds a length-to-thickness threshold and an angle relative to vertical that exceeds an angle threshold.

11. The method of claim 1, wherein the ferromagnetic additive is selected from a group consisting of: iron, nickel, cobalt, awaruite, wairauite.

12. The method of claim 11, wherein the material comprises a thermoplastic compounded with the ferromagnetic additive to achieve a loading weight.

13. The method of claim 12, wherein the loading weight of ferromagnetic additive in the thermoplastic is within an inclusive range of 0.1% to 5.0%.

14. The method of claim 12, wherein the loading weight of ferromagnetic additive in the thermoplastic is within an inclusive range of 5.0% to 30.0%.

15. A three-dimensional printer comprising:
   a platform;
   a nozzle for printing a component on the platform using a material containing a ferromagnetic additive; and
   a plurality of inductors surrounding the platform, the plurality of inductors configured to receive electricity during printing the component to deform the component by generating a magnetic field that interacts with the ferromagnetic additive.

16. The three-dimensional printer of claim 15, further comprising:
   a plurality of sensors proximate to the platform, wherein the plurality of sensors is configured to identify an out-of-tolerance feature of the component during printing.

17. A component comprising:
- a first portion fabricated by three-dimensional printing using a thermoplastic;
- an unsupported portion fabricated by three-dimensional printing using a thermoplastic with a ferromagnetic additive; and
- a surface portion fabricated by three-dimensional printing using a thermoplastic with a plurality of concentrations of the ferromagnetic additive corresponding to surface texture features of the surface portion.

18. The component of claim 17, wherein the ferromagnetic additive in the unsupported portion is aligned according to interaction with a magnetic field during fabrication, wherein the unsupported portion includes a length-to-thickness ratio that is greater than 2 and a deviation from vertical that is greater than 30°.

19. The component of claim 17, wherein respective concentrations of the ferromagnetic additive are between 0.1 millimeters and 3.0 millimeters below respective protrusions on the surface portion.

* * * * *